(12) United States Patent
Luo et al.

(10) Patent No.: US 8,724,994 B2
(45) Date of Patent: *May 13, 2014

(54) HEADER ERROR CONTROL PROTECTED TEN GIGABIT PASSIVE OPTICAL NETWORK DOWNSTREAM FRAME SYNCHRONIZATION PATTERN

(71) Applicant: Futurewei Technologies, Inc., Plano, TX (US)

(72) Inventors: Yuanqiu Luo, Cranbury, NJ (US); Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,400

(22) Filed: Jun. 11, 2013

(65) Prior Publication Data

US 2013/0272706 A1    Oct. 17, 2013

Related U.S. Application Data

(63) Continuation of application No. 12/884,566, filed on Sep. 17, 2010, now Pat. No. 8,483,563.

(60) Provisional application No. 61/287,024, filed on Dec. 16, 2009.

(51) Int. Cl.
*H04J 14/00* (2006.01)
*H04B 10/20* (2006.01)

(52) U.S. Cl.
USPC .................................. 398/71; 398/58; 398/72

(58) Field of Classification Search
USPC ......... 398/58, 66–68, 70–72, 77, 78; 370/476
See application file for complete search history.

(56) References Cited

U.S. PATENT DOCUMENTS 8,483,563 B2 * 7/2013 Luo et al. .................... 398/71
2003/0219015 A1   11/2003 Constant Six et al.
(Continued)

FOREIGN PATENT DOCUMENTS

CN    1459961 A    12/2003
CN    1913410 A    2/2007
(Continued)

OTHER PUBLICATIONS

Foreign Communication From a Counterpart Application, Australian Application No. 2010333484, Australian Office Action dated Aug. 7, 2013, 3 pages.

(Continued)

*Primary Examiner* — Dalzid Singh
(74) *Attorney, Agent, or Firm* — Conley Rose, P.C.; Grant Rodolph; Brandt D. Howell

(57) ABSTRACT

An apparatus comprising an optical line terminal (OLT) configured to couple to a plurality of optical network units (ONUs) and transmit a plurality of downstream frames to the ONUs, wherein each of the downstream frames comprises a plurality of forward error correction (FEC) codewords and a plurality of additional non-FEC encoded bytes that comprise synchronization information that is protected by Header Error Control (HEC) code. An apparatus comprising a processing unit configured to arrange control data, user data, or both into a plurality of FEC codewords in a downstream frame and arrange a physical synchronization sequence (PSync), a superframe structure, and a Passive Optical Network-identifier (PON-ID) structure in a plurality of additional non-FEC encoded bytes in the downstream frame, and a transmission unit configured to transmit the FEC codewords and the additional non-FEC encoded bytes in the downstream frame within a 125 microsecond window.

19 Claims, 8 Drawing Sheets

(56) References Cited

U.S. PATENT DOCUMENTS

| | | | | |
|---|---|---|---|---|
| 2009/0263130 | A1* | 10/2009 | Luo et al. | 398/58 |
| 2013/0156420 | A1* | 6/2013 | Amitai et al. | 398/27 |

FOREIGN PATENT DOCUMENTS

| | | | |
|---|---|---|---|
| CN | 101047470 | A | 10/2007 |
| EP | 1365548 | A1 | 11/2003 |
| JP | 2006101061 | A | 4/2006 |
| JP | 2009246586 | A | 10/2009 |
| KR | 20010048327 | A | 6/2001 |

OTHER PUBLICATIONS

Foreign Communication From a Counterpart Application, Canadian Application No. 2,784,543, Canadian Office Action dated Jul. 26, 2013, 3 pages.

"Series G: Transmission Systems and Media, Digital Systems and Networks, Digital Sections and Digital Line System—Optical Line Systems for local and access networks, 10-Gigabit-capable passive optical networks (XG-PON): General Requirements," G.987.1, ITU-T Telecommunication Standardization Sector of ITU, Jan. 2010, 52 pages.

"Series G: Transmission Systems and Media, Digital Systems and Networks, Digital Sections and digital line system—Optical Line Systems for local and access networks, ONT management and control interface specifications for B-PON system with protection features," G.983.6, ITU-T Telecommunication Standardization Sector of ITU, Jun. 2002, 22 pages.

"Series G: Transmission Systems and Media, Digital Systems and Networks, Digital Sections and digital line System—Optical Line Systems for local and access networks, Gigabit-capable passive optical networks (G-PON): Transmission convergence layer specification," G.984.3, ITU-T Telecommunication Standardization Sector of ITU, Mar. 2008, 146 pages.

"10-Gigabit-capable passive optical networks (XG-PON) Transmission convergence (TC) Specifications," Draft Recommendation ITU-T G.987.3 (ex G.xgpon.3) (new) Rev.1, Draft Recommendation, 152 pages.

"Series G: Transmission Systems and Media, Digital Systems and Networks, Digital Sections and digital line system—Optical line systems for local and access networks, 10-Gigabit-capable passive optical networks (XG-PON): Transmission convergence (TC) layer specification," G.987.3, ITU-T Telecommunication Standardization Sector of ITU, Oct. 2010, 134 pages.

"Question 2/15—Optical systems for fibre access networks," ITU-T Study Group 15, Question 2/15 (Study Period 2009-2012), 3 pages.

Office Action dated Dec. 27, 2012, 10 pages, U.S. Appl. No. 12/884,566, filed Sep. 17, 2010.

Notice of Allowance dated Mar. 11, 2013, 5 pages, U.S. Appl. No. 12/884,566, filed Sep. 17, 2010.

Foreign Communication From a Counterpart Application, PCT Application PCT/CN2010/079453, International Search Report dated Mar. 10, 2011, 5 pages.

Foreign Communication From a Counterpart Application, PCT Application PCT/CN2010/079453, Written Opinion dated on Mar. 10, 2011, 7 pages.

Foreign Communication From a Counterpart Application, European Application No. 10837015.6, Extended European Search Report dated Sep. 5, 2012, 7 pages.

Foreign Communication From a Counterpart Application, Japanese Application No. 2012-543456, Japanese Office Action dated Nov. 12, 2013, 3 pages.

Foreign Communication From a Counterpart Application, Japanese Application No. 2012-543456, English Translation of Japanese Office Action dated Nov. 12, 2013, 3 pages.

Heegard, C., et al., "Dual Precoding for FEC and Updated Normative Text for Section 7.5," IEEE P802.11, Wireless LANs, IEEE 802.11-02/-325r0, May 8, 2002, 11 pages.

Ly, A., et al., "Protocol Independent PHY Specific Sub-Layer (PSS) for PON," IEEE EFM Interim, Los Angeles, Oct. 2001, 8 pages.

* cited by examiner

HEADER ERROR CONTROL PROTECTED TEN GIGABIT PASSIVE OPTICAL NETWORK DOWNSTREAM FRAME SYNCHRONIZATION PATTERN

CROSS-REFERENCE TO RELATED APPLICATIONS

The present application claims priority to U.S. patent application Ser. No. 12/884,566, filed Sep. 17, 2010 filed by Yuanqui Luo, et al., and entitled "Header Error Control Protected Ten Gigabit Passive Optical Network Downstream Frame Synchronization Pattern," which claims priority to U.S. Provisional Patent Application 61/287,024, filed Dec. 16, 2009 by Yuanqiu Luo, et al., and entitled "HEC Protected XG-PON1 Downstream Frame Sync Pattern," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, some emerging PON systems, such as Next Generation Access (NGA) systems, are being reconfigured to transport the data frames with improved reliability and efficiency at higher bandwidths, for example at about ten Gbps.

SUMMARY

In one embodiment, the disclosure includes an apparatus comprising an OLT configured to couple to a plurality of ONUs and transmit a plurality of downstream frames to the ONUs, wherein each of the downstream frames comprises a plurality of forward error correction (FEC) codewords and a plurality of additional non-FEC encoded bytes that comprise synchronization information that is protected by Header Error Control (HEC) code.

In another embodiment, the disclosure includes an apparatus comprising a processing unit configured to arrange control data, user data, or both into a plurality of FEC codewords in a downstream frame and arrange a physical synchronization sequence (PSync), a superframe structure, and a Passive Optical Network-identifier (PON-ID) structure in a plurality of additional non-FEC encoded bytes in the downstream frame, and a transmission unit configured to transmit the FEC codewords and the additional non-FEC encoded bytes in the downstream frame within a 125 microsecond window.

In yet another embodiment, the disclosure includes a method comprising implementing, at an ONU, a synchronization state machine that comprises a Hunt State, a Pre-Sync State, and a Sync State for a plurality of downstream frames, wherein each of the downstream frames comprises a physical synchronization block (PSBd) comprising a Physical synchronization (PSync) pattern, a superframe structure, and a PON-ID structure, wherein the superframe structure comprises a superframe counter and a first HEC protecting the superframe structure, and wherein the PON-ID structure comprises a PON-ID and a second HEC protecting the PON-ID structure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In PON systems, errors in a plurality of frames may be corrected using a FEC scheme. According to the FEC scheme, the transmitted frames may comprise a plurality of FEC codewords, which may comprise a plurality of data blocks and parity blocks. Each quantity of blocks that correspond to an FEC codeword may then be aligned or "locked" using a "state machine," e.g. in a buffer, framer, or memory location at an ONU or OLT. The FEC codeword may be locked after detecting one by one its data blocks and parity blocks and verifying that the blocks' sequence matches the expected block sequence of an FEC codeword. Otherwise, when a block is detected as out of sequence, the process may be restarted at the second block in the block's sequence to detect and lock the correct block sequence.

Disclosed herein is a system and method for supporting transmission synchronization and error detection/correction in PON systems, such as 10 Gigabit PONs (XGPONs). The system and method uses a framing mechanism that supports the FEC scheme and provides transmission synchronization in the PON. The frames may be transmitted within a plurality of transmission windows, e.g. about 125 microseconds time periods, where each transmission window may comprise an integer multiple of FEC codewords for error detection/correction. The transmission window may also comprise additional or extra bytes that may be used for transmission synchronization. The extra bytes may comprise frame synchronization and/or time synchronization and may not be FEC encoded (e.g. not protected by FEC), and therefore may not be handled by the FEC scheme. Instead, the extra bytes may also comprise HEC encoding, which may provide error detection/correction for the synchronization information in the frames.

Figure 1:
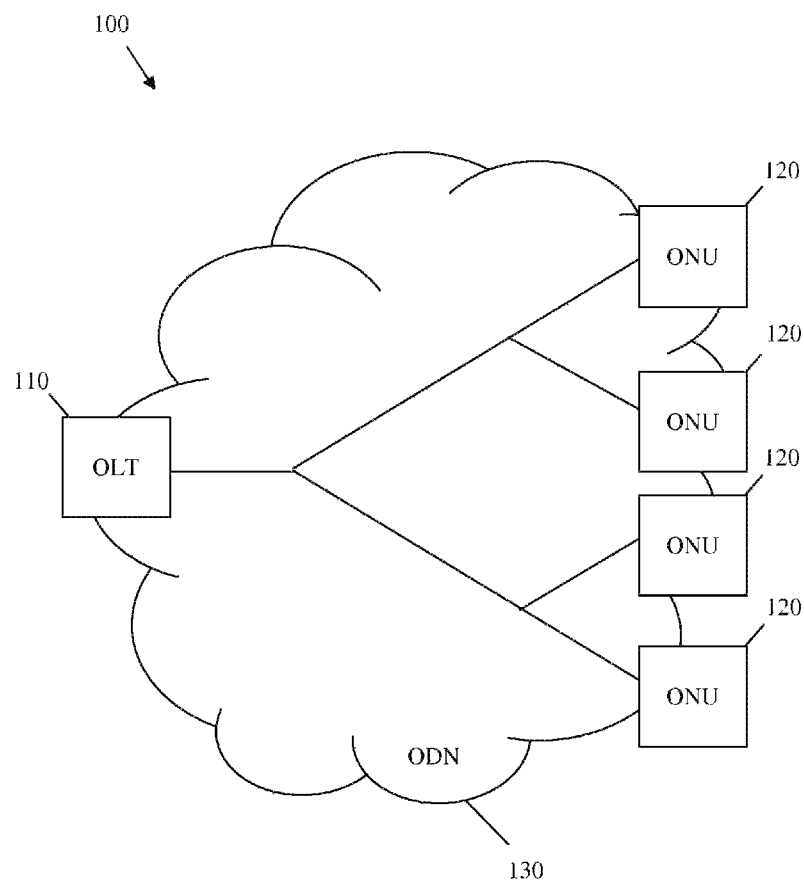
FIG. 1 is a schematic diagram of an embodiment of a PON.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be NGA systems, such as ten Gigabit GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the International Telecommunication Union Telecommunication Standardization Sector (ITU-T) G.983 standard, the GPON defined by the ITU-T G.984 standard, the Ethernet PON (EPON) defined by the Institute of Electrical and Electronics Engineers (IEEE) 802.3ah standard, the 10 Gigabit EPON as described in the IEEE 802.3av standard, and the Wavelength Division Multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110, the ONUs 120, or both may be configured to implement an FEC scheme to control or reduce transmission errors. As part of the FEC scheme, the data may be combined with an error correction code, which may comprise redundant data, before being transmitted. For instance, the data and the error correction code may be encapsulated or framed into a FEC codeword, which may be received and decoded by another PON component. In some embodiments, the FEC codeword may comprise the error correction code and may be transmitted with the data without modifying the data bits. When the error correction code is received, at least some of the errors in the transmitted data, such as bit errors, may be detected and corrected without the need to transmit additional data. Transmitting the error correction code in addition to the data may consume at least some of the channel bandwidth, and hence may reduce the bandwidth available for data. However, the FEC scheme may be used for error detection instead of a dedicated back-channel to reduce the error detection scheme complexity, cost, or both.

The FEC scheme may comprise a state machine model, which may be used to lock an FEC codeword, e.g. determine if a plurality of received blocks that represent the FEC codeword are aligned appropriately or in a correct sequence. Locking the FEC codeword or verifying the FEC blocks' alignment may be necessary to obtain the data and the error correction code correctly. For instance, the OLT 110, the ONUs 120, or both may comprise an FEC processor, which may be hardware, such as a circuit, or software that implements the state machine model. The FEC processor may be coupled to the corresponding receivers and/or deframers at the OLT 110 or the ONUs 120, and may use analog-to-digital conversion, modulation and demodulation, line coding and decoding, or combinations thereof. The FEC codeword comprising the received blocks may also be locked at a memory location or buffer coupled to the FEC processor and the receiver.

Typically, downstream data in PON systems may be transmitted in a plurality of GPON Transmission Container (GTC) frames, e.g. at a GTC layer, within a plurality of corresponding fixed time windows, e.g. of about 125 microseconds. A GTC frame may comprise a downstream Physical Control Block (PCBd) and a GTC payload (e.g. user data) that may not comprise time or time of day (ToD) information. However, to establish PON transmissions synchronization, ToD information or any other synchronization information may be needed in the transmitted frames. In an embodiment, the OLT 110 may be configured to transmit ToD information and/or any other synchronization information to the ONU(s) 120, for instance in a downstream frame in a corresponding transmission window. The downstream frame may also support the FEC scheme for error detection and correction. Accordingly, the transmission window may comprise FEC code words, which may comprise data and error correction code, and time or ToD information. Specifically, the transmission window may comprise an integer multiple of FEC codewords and a plurality of extra or additional bytes that may not be FEC encoded, and therefore may not be handled or protected from errors using the FEC scheme. The additional or extra bytes may be used to provide time (e.g. ToD) and/or synchronization information for PON transmissions and may also comprise HEC encoding that may be used to detect and/or correct any errors in the synchronization data.

For instance, the OLT 110 may transmit downstream data in a plurality of XGPON Transmission Container (XGTC) frames within a corresponding time window of about 125 microseconds or any fixed length time window. The XGTC frame (and the corresponding time window) may comprise a payload that comprises the FEC codewords, for example about 627 FEC codewords using Reed Solomon (RS) (248,x) FEC encoding (e.g. x is equal to about 216 or about 232). Additionally, the XGTC frame (and the corresponding time window) may comprise additional bytes (e.g. in the PCBd), e.g. about 24 bytes, that comprise synchronization and/or time synchronization data and HEC encoding, as described in detail below.

Figure 2:
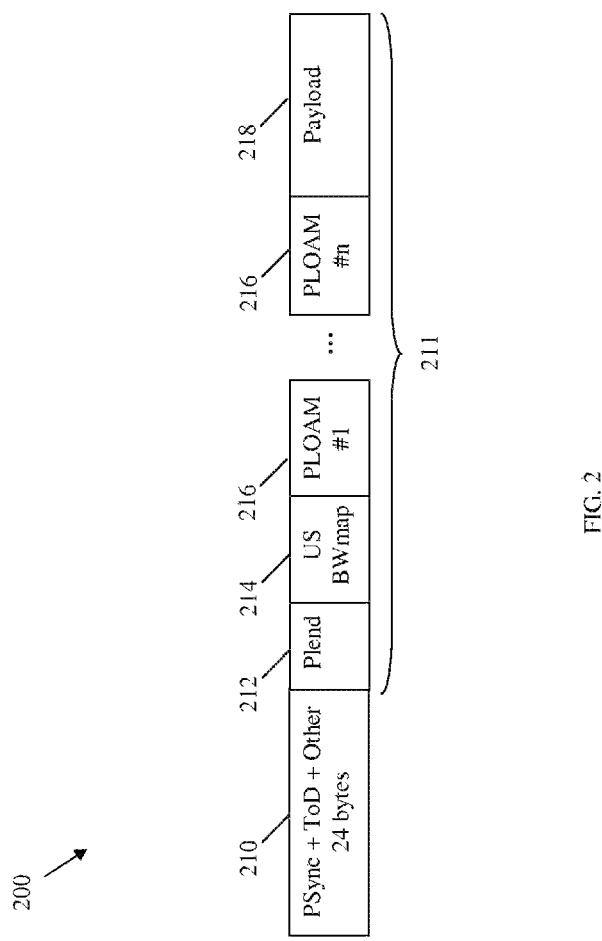
FIG. 2 is a schematic diagram of an embodiment of a frame.

FIG. 2 illustrates an embodiment of a frame 200, which may comprise FEC encoded control and/or user data and non-FEC encoded synchronization information. For instance, the frame 200 may correspond to a GTC or XGTC frame, e.g. downstream from the OLT 110 to an ONU 120, and may be transmitted within a fixed time window. The frame 200 may comprise a first portion 210 and a second portion 211. The first portion 210 may correspond to a GTC or XGTC PCBd or header and may comprise time or synchronization information, such as a PSync pattern, a ToD, other time and/or frame synchronization information or combinations thereof. Specifically, the time or synchronization information may not be FEC encoded and may be associated with HEC encoding in the first portion 210, which may be used to detect/correct a plurality of bit errors that may occur in the first portion 210. The first portion 210 is described in more detail below. In an embodiment, the frame 200 may correspond to a GTC or XGTC frame that is encoded using RS (248,x), and thus the first portion 210 may comprise about 24 bytes. Although, the first portion 210 precedes the second portion 211 in FIG. 2, in other embodiments, the first portion 210 may be located in other locations of the frame 200, such as subsequent to the second portion 211.

The second portion 211 may correspond to a GTC or XGTC payload and may comprise a plurality of codewords that may be FEC encoded. For instance, the second portion 211 may comprise an integer multiple of FEC codewords. The GTC or XGTC payload may comprise a Payload Length downstream (Plend) 212, an Upstream Bandwidth map (US BWmap) 214, at least one Physical Layer Operations, an Administration and Maintenance (PLOAM) field 216, and a payload 218. The Plend 212 may comprise a plurality of subfields, including a B length (Blen) and a cyclic redundancy check (CRC). The Blen may indicate the length of the US BWmap 214, e.g. in bytes. The CRC may be used to verify the presence of errors in the received frame 200, e.g. at the ONU 120. For instance, the frame 200 may be discarded when the CRC fails. In some PON systems that support asynchronous transfer mode (ATM) communications, the subfields may also include an A length (Alen) subfield that indicates the length of an ATM payload, which may comprise a portion of the frame 200. The US BWmap 214 may comprise an array of blocks or subfields, each of which may comprise a single bandwidth allocation to an individual Transmission Container (TC), which may be used for managing upstream bandwidth allocation in the GTC layer. The TC may be a transport entity in the GTC layer that may be configured to transfer higher-layer information from an input to an output, e.g., from the OLT to the ONU. Each block in the BWmap 214 may comprise a plurality of subfields, such as an Allocation identifier (Alloc-ID), a Flags, a Start Time (SStart), a Stop Time (SStop), a CRC, or combinations thereof.

The PLOAM fields 216 may comprise a PLOAM message, which may be sent from the OLT to the ONU and include Operations, Administration and Maintenance (OAM) related alarms or threshold-crossing alerts triggered by system events. The PLOAM field 216 may comprise a plurality of sub-fields, such as an ONU identifier (ONU-ID), a message identifier (Message-ID), a message data, and a CRC. The ONU-ID may comprise an address, which may be assigned to one of the ONUs and may be used by that ONU to detect its intended message. The Message-ID may indicate the type of the PLOAM message and the message data may comprise the payload of the PLOAM message. The CRC may be used to verify the presence of errors in the received PLOAM message. For instance, the PLOAM message may be discarded when the CRC fails. The frame 200 may comprise different PLOAMs 216 that correspond to different ONUs, which may be indicated by different ONU-IDs. The payload 218 may comprise broadcast data (e.g. user data). For instance, the payload 218 may comprise a GPON Encapsulation Method (GEM) payload.

Figure 3:
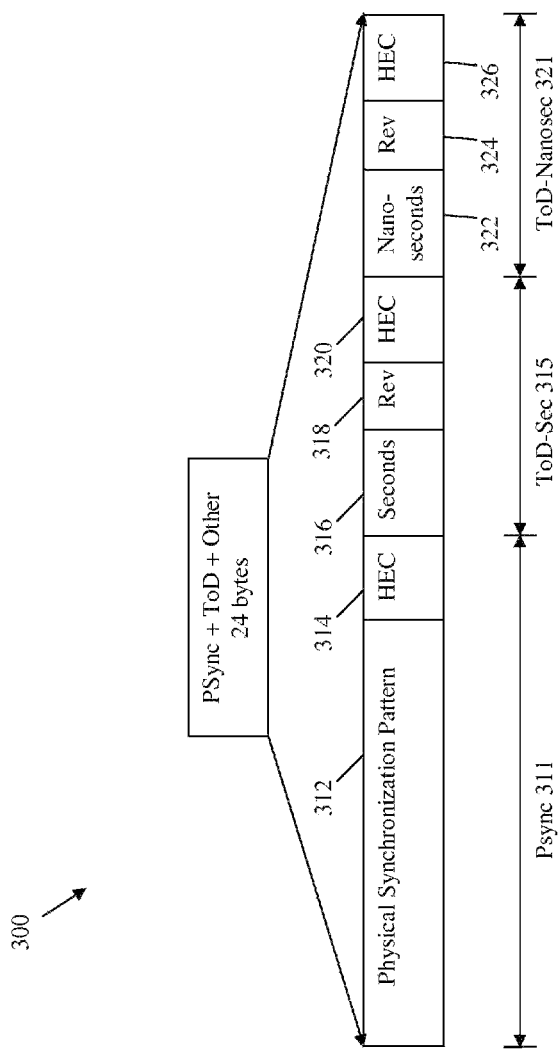
FIG. 3 is a schematic diagram of an embodiment of a portion of a frame.

FIG. 3 illustrates an embodiment of a frame portion 300 that may comprise non-FEC encoded synchronization information, such as in a downstream GTC or XGTC frame. For instance, the frame portion 300 may correspond to the first portion 210 of the frame 200. The frame portion 300 may comprise a PSync field 311, a ToD in seconds (ToD-Sec) field 315, and a ToD in nanoseconds (ToD-Nanosec) field 321. In an embodiment, the frame portion 300 may comprise about 24 bytes, where each of the PSync field 311, the ToD-Sec field 315, and the ToD in nanoseconds field 321 may comprise about eight bytes. Further, each of the PSync field 311, the ToD-Sec field 315, and the ToD-Nanosec field 321 may comprise HEC encoding that may be used to detect/correct errors in the corresponding field.

The PSync field 311 may comprise a PSync pattern 312 and a HEC field 314. The PSync pattern 312 may be used at an ONU, for instance at a data framer coupled to a receiver, to detect the beginning of the downstream frame portion 300 (or the frame 200) and establish synchronization accordingly. For example, the PSync pattern 312 may correspond to a fixed pattern that may not be scrambled. The HEC field 314 may provide error detection and correction for the PSync field 311. For example, the HEC 314 may comprise a plurality of bits that correspond to a Bose and Ray-Chaudhuri (BCH) code with a generator polynomial and a single parity bit. In an embodiment, the PSync pattern 312 may comprise about 51 bits and the HEC field 314 may comprise about 13 bits.

The ToD-Sec field 315 may comprise a Seconds field 316, a Reserved (Rev) field 318, and a second HEC field 320. The Seconds field 316 may comprise an integer portion of the ToD associated with the frame in units of seconds, and the Reserved field 318 may be reserved or may not be used. The second HEC 320 may be configured substantially similar to the HEC 314 and may provide error detection and correction for the ToD-Sec field 315. In an embodiment, the Seconds field 316 may comprise about 48 bits, the Reserved field 318 may comprise about three bits, and the second HEC field 320 may comprise about 13 bits.

The ToD-Nanosec field 321 may comprise a Nanoseconds field 322, a second Reserved (Rev) field 324, and a third HEC field 326. The Nanoseconds field 322 may comprise a fractional portion of the ToD associated with the frame in units of nanoseconds, and the second Reserved field 324 may be reserved or may not be used. The third HEC 326 may be configured substantially similar to the HEC 314 and may provide error detection and correction for the ToD-Nanosec field 321. In an embodiment, the Nanoseconds field 322 may comprise about 32 bits, the second Reserved field 324 may comprise about 19 bits, and the third HEC field 326 may comprise about 13 bits.

Figure 4:
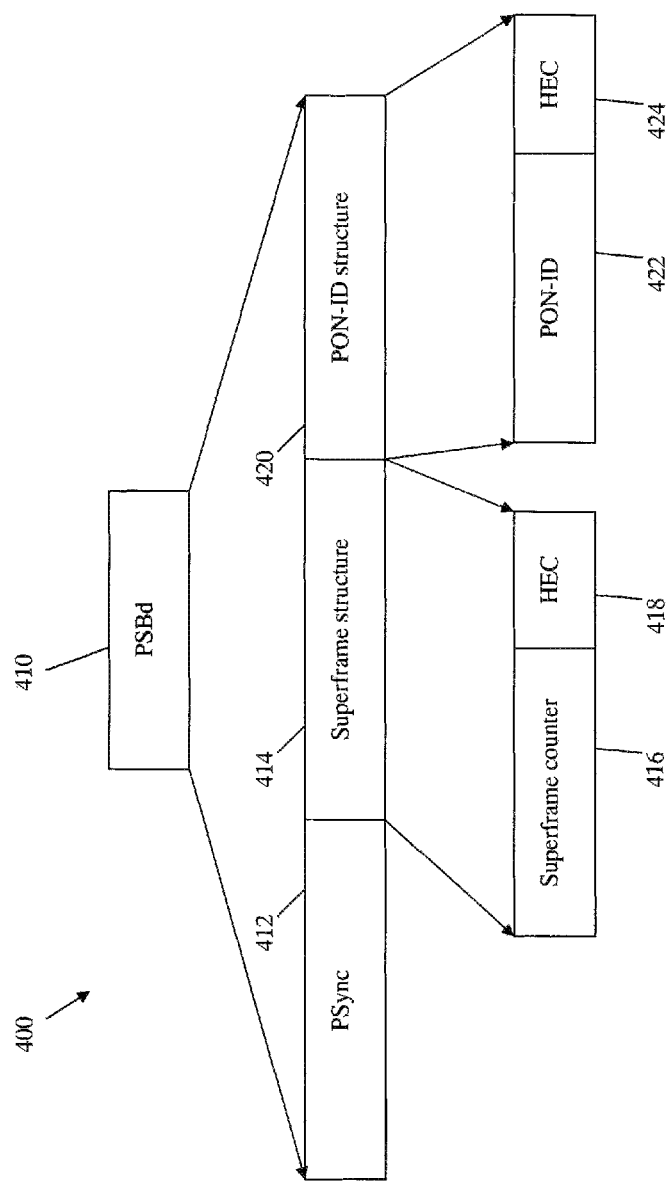
FIG. 4 is a schematic diagram of another embodiment of a portion of a frame.

FIG. 4 illustrates another embodiment of a frame portion 400 that may comprise non-FEC encoded synchronization information. For instance, the frame portion 400 may correspond to a PSBd in a downstream GTC or XGTC frame. The PSBd 410 may comprise a PSync pattern 412, a superframe structure 414, and a PON-ID structure 420. In an embodiment, the frame portion 200 or PSBd may comprise about 24 bytes, where each of the PSync pattern 412, the superframe structure 414, and the PON-ID structure 420 may comprise about eight bytes. Further, each of the superframe structure 414 and the PON-ID structure 420 may comprise HEC encoding that may be used to detect/correct errors in the corresponding field.

The PSync pattern 412 may be used to detect the beginning of the PSBd in the frame and may comprise about 64 bits. The PSync pattern 412 may be used by the ONU to align the frame at the downstream frame boundary. The PSync pattern 412 may comprise a fixed pattern, such as 0xC5E5 1840 FD59 BB49. The superframe structure 414 may comprise a superframe counter 416 and a HEC code 418. The superframe counter 416 may correspond to the most significant about 51 bits of the superframe structure 414 and may specify a sequence of transmitted downstream frames. For each downstream (XGTC or GTC) frame, the superframe counter 416 may comprise a larger value than the previous transmitted downstream frame. When the superframe counter 416 reaches a maximum value, a subsequent superframe counter 416 in a subsequent downstream frame may be set to about zero. The HEC code 418 may correspond to the least significant about 13 bits of the superframe structure 414 and may be configured substantially similar to the HEC fields described above. The HEC code 418 may be a combination of a BCH code that operates on about 63 initial bits of the frame header and a single parity bit.

The PON-ID structure 420 may comprise a PON-ID 422 and a second HEC code 424. The PON-ID 422 may correspond to about 51 bits of the PON-ID structure 420 and the HEC code may correspond to the remaining about 13 bits. The PON-ID 422 may be set by the OLT and used by the ONU to detect protection switching events or for security key generation. The second HEC code 424 may be configured substantially similar to the HEC fields described above. Specifically, the HEC code 418 may be used to detect/correct errors in the superframe counter 416 and the second HEC code 424 may be used to detect/correct errors in the PON-ID 422.

Since the synchronization information may be encapsulated in a plurality of extra bytes in the downstream frames that may not be FEC encoded, the HEC code may be added to the synchronization information in the extra bytes, as described in the frame portion 300 or the frame portion 400, to provide sufficient or acceptable error detection/correction capability for the synchronization information at the ONU. This HEC encoding scheme may provide efficient error detection/correction in a plurality of cases. For instance, when the ONU is in a fast-sleeping context, the ONU may re-lock every certain time period (e.g. every about 10 microseconds) to the OLT. As such, multiple errors may occur in the non-FEC encoded extra bytes (e.g. about 24 bytes) in case of false locking. However, there may be a substantially high probability that the errors are prevented or accounted for using the HEC encoding in the extra bytes.

For example, in the case of a bit error rate (BER) of about 1e−03 in the PON downstream transmission, a HEC code that comprises about 13 bits within a corresponding about eight bytes field in the downstream frame, such as the HEC fields described above, may be used to detect up to about three bit errors and to correct up to about two bit errors in the corresponding eight bytes field. In this case, the probability of obtaining about three bit errors in a corresponding about eight byte field after using the HEC scheme may be substantially small, e.g. equal to about 0.0039 percent. The three bit errors may be detected but may not be corrected using the HEC scheme. Further, the probability of obtaining about four bit errors or more in the corresponding about eight bytes field after using the HEC scheme may be equal to about 0.0001 percent. However, the chances of obtaining about two error bits or less using the HEC scheme may be substantially high, e.g. equal to about 99.996 percent. The two bit errors may be detected and corrected using the HEC scheme.

During the frame locking process, the frame may be validated efficiently with at least about two correctable PSync patterns in the received frame. For instance, the ONU may successfully lock the downstream frame if at least about two PSync patterns, such as the PSync pattern 312, have been received and detected correctly, e.g. in two subsequent about eight bytes fields. The probability of detecting two consecutive PSync patterns correctly using two corresponding HEC codes, such as in the HEC field 314, may be substantially high, e.g. equal to about 99.996 percent raised to the second power or about 99.992 percent (e.g. 99.996%^2=99.992 percent). Thus, using about 24 extra bytes that comprise HEC encoding, as described in FIGS. 2, 3, and 4 may enable the ONU to lock the downstream frame successfully at a substantially high level of certainty (e.g. about 99.992 percent).

Further, the chance of establishing a false lock at the ONU may require detecting two subsequent PSync fields that comprise the same fixed pattern (e.g. comprise the same bit errors). Such a situation may most likely occur when there may be about four bit errors in both PSync patterns. The probability of receiving the same about four bits in two corresponding about 64 bits (or the about 24 extra bytes in the frame) may be calculated by the binomial coefficient that is one out of 64*63*62*61/(1*2*3*4) or about 1/635,376 percent. As such, the chance of getting two false PSync patterns may be equal to about 0.0001 percent raised to the second power or about 1e−12 percent. Thus, the chance of establishing a false lock may be about equal to the product (1/635376)×(1e−12) or about 5e−19 percent, which may be negligible. In a relatively fast-sleeping context of re-locking, e.g. about every ten microseconds, this situation may correspond to one false lock occurring every about 1.7e16 seconds and may be tolerated.

Figure 5:
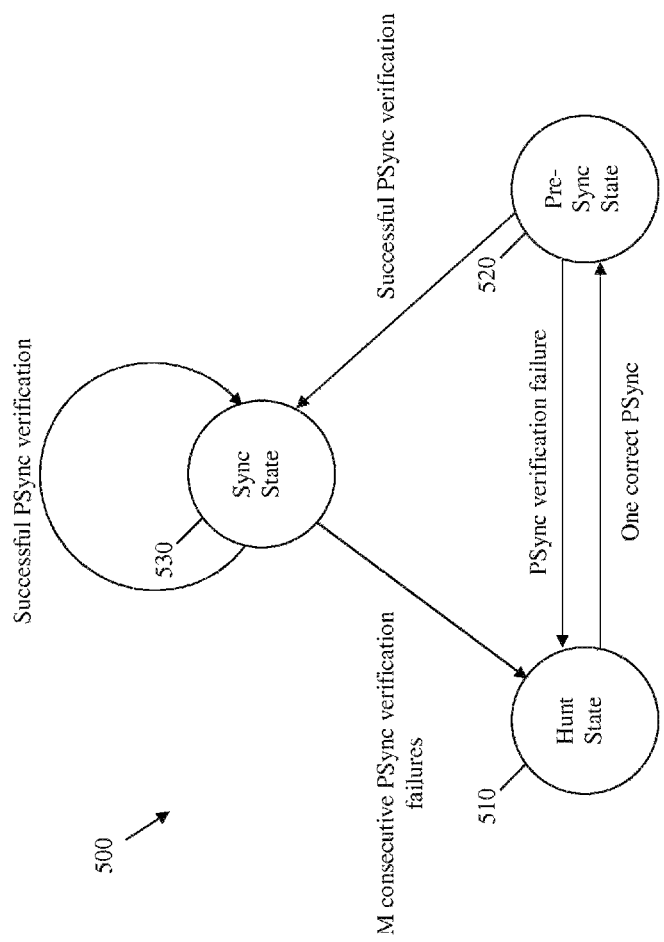
FIG. 5 is a schematic diagram of an embodiment of a synchronization state machine.

FIG. 5 illustrates an embodiment of a synchronization state machine 500, which may be used, e.g. by the ONU, to synchronize a downstream transmitted frame, such as the frame 200. The synchronization state machine 500 may use a PSync pattern in the downstream frame that may not be FEC encoded, such as the PSync pattern 312 or the PSync pattern 412. The PSync pattern may be located in a portion of the downstream frame, such as the PSBd, the frame portion 300, or the first portion 210. In some embodiments, the PSync pattern may be protected by a HEC code, such as the HEC field 314.

The synchronization state machine 500 may be implemented by the ONU, e.g. using software, hardware, or both. The synchronization state machine 500 may begin at a Hunt State 510, where a search for the PSync pattern in all possible alignments (e.g. bit and/or byte alignments) may be performed. If a correct PSync pattern is found, then the synchronization state machine 500 may transition to a Pre-Sync State 520, where a search for a second PSync pattern that follows the last detected PSync pattern by a fixed time length (e.g. by about 125 microseconds) may be performed. If a second PSync pattern is not found successfully at the Pre-Sync State 520, then the synchronization state machine 500 may return from the Pre-Sync State 520 back to the Hunt State 510. If a second PSync pattern is found successfully at the Pre-Sync State 520, then the synchronization state machine 500 may transition to a Sync State 530. If the Sync State 530 is reached, the synchronization state machine 500 may declare a successful synchronization of the downstream frame, and subsequently frame processing may begin. In an embodiment, if the ONU detects M consecutive incorrect PSync fields or patterns (M is an integer), then the synchronization state machine 500 may declare an unsuccessful synchronization of the downstream frame and return back to the Hunt State 510. For instance, M may be equal to about five.

Figure 6:
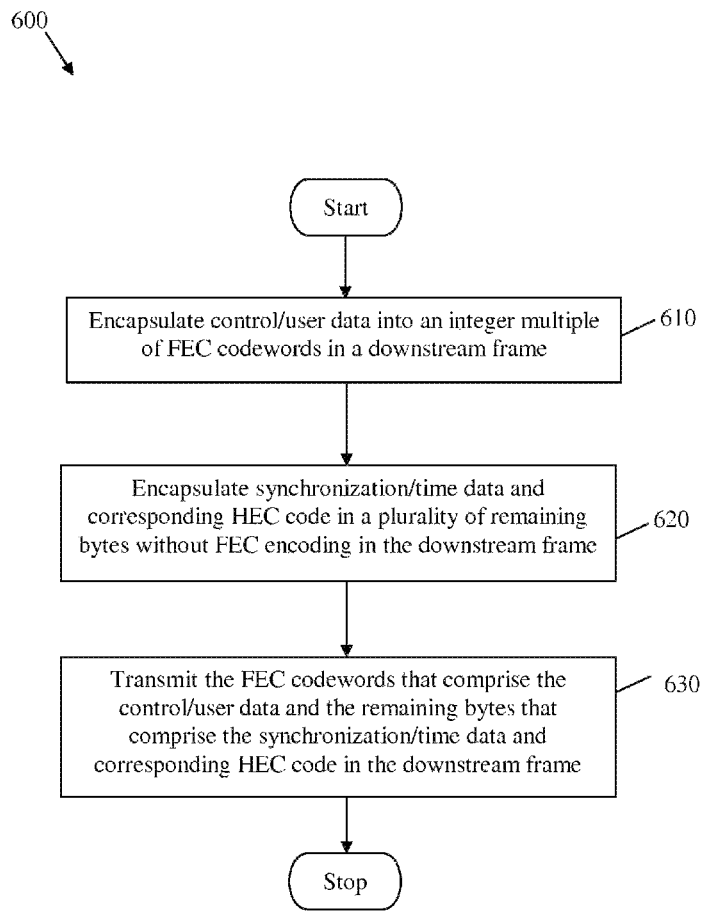
FIG. 6 is a flowchart of an embodiment of a PON framing method.

FIG. 6 illustrates an embodiment of a framing method 600, which may be used, e.g. by the OLT, for framing a downstream frame, such as a XGTC or GTC frame before sending the downstream frame to the ONU(s). The downstream frame may comprise control and/or user data that may be FEC encoded and synchronization and/or time data that may not be FEC encoded. However, at least some of the synchronization and/or time data may be protected in the downstream frame using HEC code. At block 610, the control data, user data, or both (control/user data) may be encapsulated into an integer multiple of FEC codewords in the downstream frame. For instance, the control/user data may be converted in to a plurality of FEC codewords that may be located in the XGTC or GTC payload portion. For example, the control/user data may comprise the Plend, a plurality of PLOAM fields or messages, user payload, or combinations thereof.

At block 620, the synchronization/time data and the corresponding HEC code may be encapsulated in a plurality of remaining bytes without FEC encoding in the downstream frame. For instance, the synchronization data may be located in the XGTC or GTC PCBd or PSBd portion. The synchronization/time data may comprise a plurality of synchronization elements, such as a PSync pattern, a ToD, a PON ID, or combinations thereof. The synchronization/time data may also comprise a corresponding HEC code or field for at least some of the synchronization/time elements, such as the ToD, the PON ID, and/or the PSync pattern. At block 630, the FEC codewords that comprise the control/user data and the remaining bytes that comprise the synchronization/time data and corresponding HEC code may be transmitted, e.g. to the ONU(s), in the downstream frame. The method 600 may then end.

Figure 7:
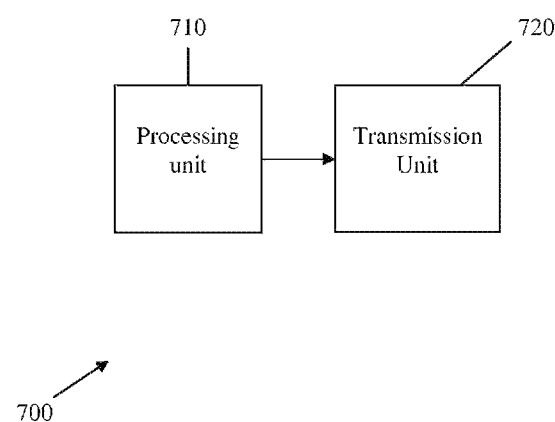
FIG. 7 is a schematic diagram of an embodiment of an apparatus configured to implement a PON framing method.

FIG. 7 illustrates an embodiment of an apparatus 700 that may be configured to implement the PON framing method 600. The apparatus may comprise a processing unit 710 and a transmission unit 720 that may be configured to implement the method 600. For example, the processing unit 710 and the transmission unit 720 may correspond to hardware, firmware, and/or software installed to run hardware. The processing unit 710 may be configured to arrange control data, user data, or both into a plurality of FEC codewords in a downstream frame and arrange synchronization information in a plurality of additional non-FEC encoded bytes in the downstream frame, such as described in steps 610 and 620 above. The synchronization information may comprise the PSync field 311, the ToD-Sec field 315, and the ToD-Nanosec field 321. Alternatively, the synchronization information may comprise the PSync pattern 412, the superframe structure 414, and the PON-ID structure 420. The processing unit 710 may then forward the FEC codewords and the additional non-FEC encoded bytes to the transmission unit 720. The transmission unit 720 may be configured to transmit the FEC codewords and the additional non-FEC encoded bytes in the downstream frame within a fixed time window, e.g. at about 125 microseconds. In other embodiments, the processing unit 710 and the transmission unit 720 may be combined into a single component or may comprise a plurality of subcomponents that may implement the method 600.

Figure 8:
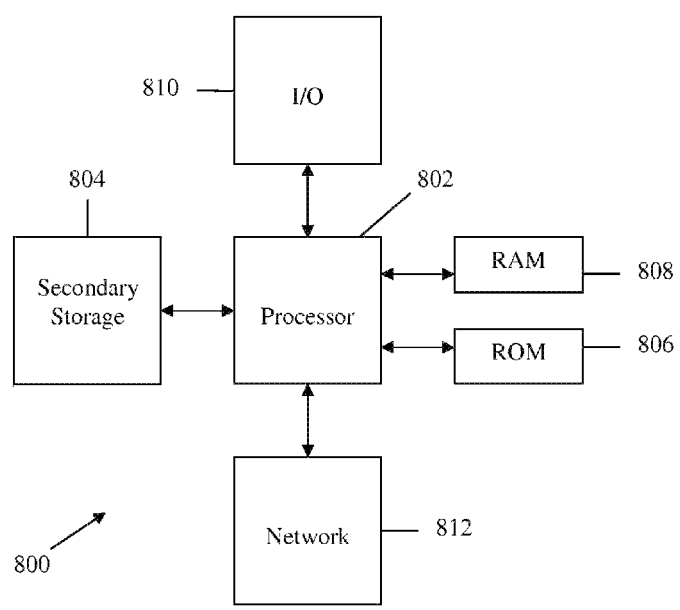
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
  an optical line terminal (OLT) configured to couple to a plurality of optical network units (ONUs) and transmit a plurality of downstream frames to the ONUs,
  wherein each of the downstream frames comprises a plurality of forward error correction (FEC) codewords and a plurality of additional non-FEC encoded bytes that comprise synchronization information,
  wherein the plurality of additional non-FEC encoded bytes are partially protected by Header Error Control (HEC) code and partially not protected by the HEC code,
  wherein the downstream frame is a 10 gigabit passive optical network transmission container (XGTC) frame that comprises a downstream Physical Synchronization Block (PSBd) and a XGTC payload,
  wherein the PSBd comprises 24 non-FEC encoded bytes,
  wherein the PSBd comprises the synchronization information, and
  wherein the XGTC payload comprises the FEC codewords.

2. The apparatus of claim 1, wherein each of the downstream frames comprises an integer number of FEC codewords, and wherein the non-FEC encoded bytes are about 24 bytes long.

3. The apparatus of claim 2, wherein the synchronization information comprises an eight-byte physical synchronization sequence, an eight-byte superframe structure, and an eight-byte Passive Optical Network-identifier (PON-ID) structure.

4. The apparatus of claim 3, wherein the HEC code comprises a 13 bit first HEC code and a 13 bit second HEC code, wherein the superframe structure comprises a 51 bit superframe counter and the first HEC code, wherein the PON-ID structure comprises a 51 bit PON-ID and the second HEC code, wherein the first HEC code protects the superframe counter, and wherein the second HEC code protects the PON-ID.

5. The apparatus of claim 4, wherein the physical synchronization sequence is not protected by any HEC code.

6. An apparatus comprising:
  an optical line terminal (OLT) configured to couple to a plurality of optical network units (ONUs) and transmit a plurality of downstream frames to the ONUs,
  wherein each of the downstream frames comprises a plurality of forward error correction (FEC) codewords and a plurality of additional non-FEC encoded bytes that comprise synchronization information,
  wherein the plurality of additional non-FEC encoded bytes are partially protected by Header Error Control (HEC) code and partially not protected by the HEC code, and
  wherein the synchronization information comprises a physical synchronization (PSync) field, a time-of-day in seconds (ToD-Sec) field, and a time-of-day in nanoseconds (ToD-Nanosec) field, and wherein each of the PSync field, the ToD-Sec field, and the TOD-Nanosec field has a length of eight bytes and is protected partially by HEC code and is partially not protected by the HEC code.

7. The apparatus of claim 6, wherein the Psync field comprises a 51 bit PSync sequence which is protected by a first 13 bit HEC code, wherein the ToD-Sec field comprises a 48 bit Seconds field, and a three bit reserved field, which is protected by a second 13 bit HEC code, and wherein the ToD-Nanosec field comprises a 32 bit nanoseconds field, and a 19 bit reserved field, which is protected by a third 13 bit HEC field.

8. The apparatus of claim 6, wherein each of the downstream frames is transmitted within a fixed time window, and wherein the number of FEC codewords is equal to about 627 FEC codewords.

9. The apparatus of claim 6, wherein the FEC codewords are encoded using a Reed Solomon (RS) (248,x) FEC encoding, where x is equal to about 216 or about 232.

10. The apparatus of claim 6, wherein the HEC code is a Bose and Ray-Chaudhuri (BCH) code with a generator polynomial and a single parity bit.

11. The apparatus of claim 6, wherein the synchronization information is not protected by any HEC code.

12. A method comprising:
processing a physical layer (PHY) frame comprising a physical synchronization block (PSB) and a scrambled PHY frame payload,
wherein the PSB comprises a physical synchronization sequence (PSync), a superframe counter (SFC) structure, and a passive optical network identifier (PON-ID) structure, and
wherein the scrambled PHY frame payload comprises a plurality of forward error correction (FEC) codewords, and
wherein the FEC codewords comprise FEC data derived from a 10-Gigabit-capable passive optical network (XG-PON) frame.

13. The method of claim 12, wherein the PSync contains a fixed 64-bit pattern that is used to achieve alignment of a PHY frame boundary.

14. The method of claim 13, wherein the SFC structure comprises a SFC and a header error correction (HEC) field, wherein the SFC value in each PHY frame is incremented by one with respect to a previous PHY frame, and wherein the HEC field is a combination of a code operating on the SFC structure.

15. The method of claim 14, wherein the PON-ID structure comprises a PON identifier and a second HEC field, wherein the PON identifier is set by an optical line terminal (OLT) at its discretion, and wherein the second HEC field is a combination of the code operating on the PON-ID structure.

16. The method of claim 15, wherein the PSync is 8 bytes long, wherein the superframe counter is 51 bits long, wherein the HEC field is 13 bits long, wherein the PON identifier is 51 bits long, and wherein the second HEC field is 13 bits long.

17. The method of claim 12, wherein the FEC codewords do not protect the PSB.

18. The method of claim 12, wherein the PHY frame is processed by an optical line terminal (OLT).

19. The method of claim 12, wherein the PHY frame is processed by an optical network unit (ONU).

* * * * *